Aug. 10, 1937.  J. A. GAINES  2,089,741

VALVE ASSEMBLY

Filed July 27, 1936

Inventor

J. A. Gaines

By Clarence A. O'Brien
Hyman Berman
Attorneys

Patented Aug. 10, 1937

2,089,741

UNITED STATES PATENT OFFICE 2,089,741

VALVE ASSEMBLY

James A. Gaines, County Line, Okla.

Application July 27, 1936, Serial No. 92,863

5 Claims. (Cl. 137—68)

This invention relates to new and useful improvements in a special type of float valve for oil field piping.

The principal object of the present invention is to provide a valve especially adapted for use in oil gathering systems. In these types of systems there are a number of tanks, some of varying capacities, all connected up by piping to the gathering station which employs a suction pump.

Another important object of the invention is to provide a float valve for oil gathering systems which will effectively serve to close off the branch pipes to the tanks as the tanks become empty, so that air will not get into the pipe system.

Other important objects and advantages of the invention will become apparent to the reader of the following specification.

Figure 1:
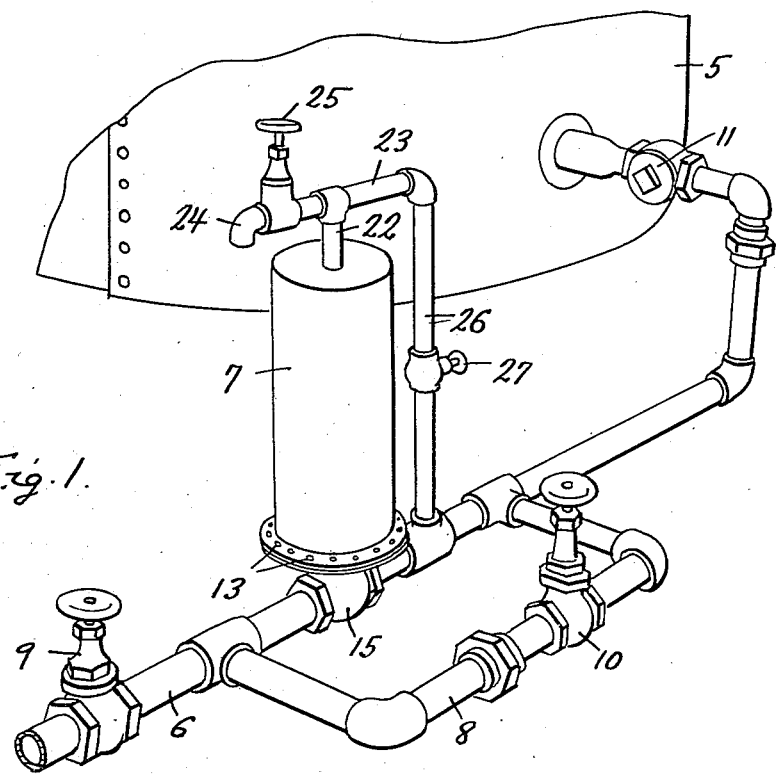
Figure 1 represents a perspective view of the valve structure and associated mechanism connected with a tank.
Figure 2:
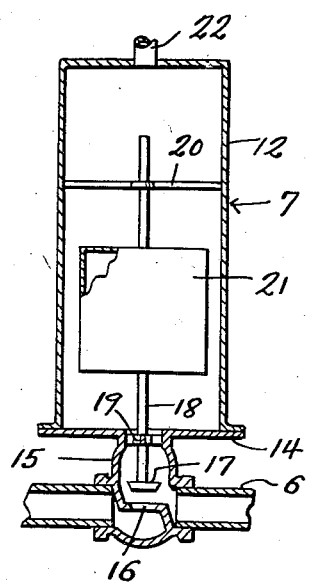
Figure 2 is a vertical sectional view through the float valve.

Referring to the drawing, wherein like numerals designate like parts, it can be seen that numeral 5 represents a tank which is connected by the branch pipe 6 to the main trunk line (not shown) to the gathering station. Numeral 7 generally refers to the valve structure which is installed in the branch line 6 and around which is the by-pass 8. In the branch pipe 6 on the outlet side of the by-pass 8 is the valve 9, while in the by-pass 8 is the valve 10. The branch pipe 6 adjacent the tank 5 is provided with a cut-off 11.

The float valve structure consists of the small tank 12 bolted as at 13 to the base plate 14 on the valve shell 15 to which the end portions of the sections of the branch pipe 6 connect. The valve shell 15 has the seat 16 therein against which the valve element 17 is seatable, the valve element 17 having an elongated stem 18 extending through the open spider 19 in the shell 15. The upper end of the stem 18 passes through the spider 20 in the upper portion of the tank 12 and has the float 21 secured to an intermediate portion thereof.

An upstanding pipe 22 is connected to the horizontal pipe 23, one end of which has the discharge nozzle 24 as well as the cut-off valve 25. The pipe 23 is connected to the vertical pipe 26 which has the valve 27 therein and which in turn connects to the branch pipe 6 on the tank 5 side of the tank 7.

It should now be understood that the suction pump at the gathering station produces a vacuum on the entire system, and as long as all the tanks have sufficient oil in them to prevent air entering the main line, the suction pump will produce a vacuum and pull the oil from the tanks into the gathering station. However, some of these tanks empty quicker than others and allow air to enter the lines which breaks the vacuum and the efficiency of the suction pump is reduced. Some of these tanks are located as far as five miles from the gathering station, while others are closer.

The valve functions in the following manner:

Assuming the valve assembly in closed condition as a result of a previous pumping operation, the status of the several elements of the assembly will be as follows:

Valve 17 will be closed and chamber 12 will be partially filled with air admitted in the preceding operation. Valves 25 and 10 will be closed. Valve 9 may be open or closed. Generally valve 9 is left open until it again becomes necessary to pump liquid from tank 5. With valves 10 and 17 closed, pipe 6 on the outlet side of valve shell 15 will be under vacuum from the distant pump station, and that portion of pipe 6 between valve 9 and valve 17 will remain under vacuum regardless of whether valve 9 is open or closed.

To open valve 17 in order that liquid may be drawn from tank 5 through pipe 6 by the suction pumps connected thereto beyond valve 9, valve 9 is closed and stop 11 opened. This will permit liquid to flow through 6 and 15 and enter the float chamber. Valve 25 is opened venting the trapped air from chamber 12 until the appearance of liquid at vent 24 indicates that chamber 12 has been filled with liquid, whereupon valve 25 will be closed. Filling of chamber 12 with liquid will not alone cause float 21 to rise and open valve 17, for at this point a vacuum will still exist in pipe 6 between valve 9 and valve 17 and generally this vacuum is too great to be overcome by the buoyancy of float 21 in the liquid in chamber 12. To break this vacuum and permit float 21 to rise and lift valve 17, valve 10 is now opened and liquid will flow from that part of pipe 6 which is on the inlet side of valve shell 15, into the evacuated segment of pipe 6 between valve 9 and valve 17, thus reducing the vacuum and balancing the static pressure on opposite sides of valve 17 and thereby permitting float 21 to rise and open valve 17. The influx of liquid admitted to pipe 6 through pipe 8 and valve 10, may also assist the opening of valve 17 by applying fluid pressure to valve 17, the extent of this pressure being governed by the difference in levels of the liquid in tank 5 and that in chamber 12. As soon as valve 17 is opened, valve 10 will be closed and valve 9 opened and liquid will then flow from tank 5 through valves 15 and 9 to the distant suction pumps.

When the level of liquid has fallen to such a point in tank 5 that air enters pipe 6 with the liquid, the air, upon reaching the point of connection of pipe 26 into pipe 6, will be trapped in pipe 26 and, valve 27 being opened in the meantime, will flow into the upper portion of chamber 12 displacing the liquid therein through valve 17 into pipe 6 causing float 21 to lower thereby seating valve 17 in seat 16 and thus close off the flow of liquid through pipe 6. Pipe 6 will remain closed until a new operation is begun as above described.

While the foregoing specification sets forth the invention in specific terms, it is to be understood that numerous changes in shape, size, and materials may be resorted to without departing from the spirit and scope of the invention as hereinafter claimed.

Having described the invention, what is claimed as new is:

1. In combination, a discharge line adapted to be connected to a tank, a vacuum relief valve in the line, a float chamber communicating with the line between the tank connection and the relief valve, a valve interposed in said line, a float operative in the chamber and operatively connected with the last-mentioned valve, a vent pipe extending from the line at the tank connection side of the float chamber and being open at its upper end, an air escape valve at the upper end of the vent pipe, a pipe connecting the upper portion of the chamber with the upper portion of the vent pipe, and a by-pass in said discharge line around said float chamber, said by-pass having a valve therein.

2. In combination, a discharge line adapted to be connected to a tank, a manually operated vacuum relief valve in the line, a float chamber having communicating connection with the line between the tank connection and the relief valve, a float controlled valve in said line for controlling the flow passage in said line, a float operative in the chamber and operatively connected with the last-mentioned valve, a vent pipe extending from the line at the tank connection side of the float chamber, a manually operated air escape valve at the outer end of the vent pipe, a pipe connecting the upper portion of the chamber with the upper portion of the vent pipe inwardly of said air escape valve and a by-pass in said discharge line and around the float chamber, said by-pass having a manually operated valve therein, and said vent pipe having a cut-off valve therein between its connection with said discharge line and float chamber respectively.

3. In combination, a suction conduit, a float operated valve mounted in said conduit, a float chamber, a float in said chamber operatively connected to said valve, a vacuum cut-off valve in the conduit at the outlet side of the float operated valve, means connected to said conduit at the inlet side of said float operated valve for separating air from liquid passing through said conduit and for introducing the air into said float chamber, a valved by-pass extending from the inlet side of said conduit around said float controlled valve and into the outlet side of said conduit at a point between the vacuum cut-off valve and said float controlled valve, and an air vent in said float chamber.

4. In combination, a discharge line adapted to be connected to an oil tank, a vacuum relief valve in the line, a float chamber communicating with the line between the tank connection and the relief valve, a second valve interposed in said line and adapted to cut off fluid flow through the line and to simultaneously cut off communication between the chamber and the portion of the line between the second valve and said vacuum relief valve, a float operative in the chamber and operatively connected to the second valve for actuating the latter, a vent pasageway extending from the line at the tank connection side of the float chamber and communicating with the atmosphere, valve means for controlling the passage of fluids through said passageway, a second passageway placing the float chamber in communication with the first passageway, and a valve by-pass having its ends communicating with the line at opposite sides of the second valve.

5. In combination, a discharge line adapted to be connected to an oil tank, a vacuum relief valve in the line, a float chamber communicating with the line between the tank connection and the relief valve, a second valve interposed in the line adapted to cut off fluid flow therethrough and to simultaneously cut off communication between said chamber and the portion of the line between said valves, a float operative in the chamber and operatively connected with the second valve for actuating the latter, means communicating with the line between the second valve and the tank connection for separating air from liquid passing through the conduit and for introducing air into the float chamber, valve means for controlling the discharge of air from the last-mentioned means and from the chamber, and a valved by-pass having one of its ends communicating with the line between the second valve and the tank connection and its other end communicating with the line between the second valve and the relief valve.

JAMES A. GAINES.